(12) United States Patent
Becker et al.

(10) Patent No.: US 8,140,504 B2
(45) Date of Patent: Mar. 20, 2012

(54) REPORT GENERATION SYSTEM AND METHOD

(75) Inventors: Jennifer G. Becker, New Hill, NC (US); Kenneth Lee McClamroch, Chapel Hill, NC (US); Peter Sun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 12/263,007

(22) Filed: Oct. 31, 2008

(65) Prior Publication Data

US 2010/0114927 A1 May 6, 2010

(51) Int. Cl.
 *G06F 17/30* (2006.01)
(52) U.S. Cl. ........ 707/705; 707/755; 707/763; 707/790; 707/791; 707/796; 707/804
(58) Field of Classification Search .................. 707/705, 707/755, 763, 790, 791, 796, 804
See application file for complete search history.

(56) References Cited

U.S. PATENT DOCUMENTS

| | | | |
|---|---|---|---|
| 6,275,791 B1 * | 8/2001 | Weise | 704/9 |
| 6,360,246 B1 * | 3/2002 | Begley et al. | 709/203 |
| 6,910,003 B1 * | 6/2005 | Arnold et al. | 704/4 |
| 6,993,533 B1 * | 1/2006 | Barnes | 1/1 |
| 7,143,107 B1 | 11/2006 | Nebres, Jr. | |
| 7,152,073 B2 * | 12/2006 | Gudbjartsson et al. | 1/1 |
| 7,702,508 B2 * | 4/2010 | Bennett | 704/257 |
| 7,870,117 B1 * | 1/2011 | Rennison | 707/706 |
| 2001/0042023 A1 * | 11/2001 | Anderson et al. | 705/26 |
| 2003/0078766 A1 * | 4/2003 | Appelt et al. | 704/9 |
| 2003/0225687 A1 * | 12/2003 | Lawrence | 705/38 |
| 2004/0039732 A1 * | 2/2004 | Huang | 707/3 |
| 2004/0088223 A1 * | 5/2004 | Bryson et al. | 705/26 |
| 2005/0251513 A1 * | 11/2005 | Tenazas | 707/3 |
| 2006/0020886 A1 * | 1/2006 | Agrawal et al. | 715/530 |
| 2006/0106874 A1 * | 5/2006 | Victor et al. | 707/104.1 |
| 2006/0167928 A1 * | 7/2006 | Chakraborty et al. | 707/102 |
| 2006/0224580 A1 * | 10/2006 | Quiroga et al. | 707/5 |
| 2006/0271379 A1 * | 11/2006 | Resnick et al. | 705/1 |
| 2006/0271582 A1 * | 11/2006 | Collins | 707/102 |
| 2007/0168302 A1 * | 7/2007 | Giovinazzo et al. | 705/36 R |
| 2007/0179975 A1 | 8/2007 | Teh et al. | |
| 2007/0203935 A1 * | 8/2007 | de Souza | 707/102 |
| 2007/0233680 A1 * | 10/2007 | Carlson et al. | 707/7 |
| 2008/0010259 A1 * | 1/2008 | Feng et al. | 707/3 |
| 2008/0082494 A1 * | 4/2008 | Polo-Malouvier et al. | 707/3 |
| 2010/0174748 A1 * | 7/2010 | Strumpf et al. | 707/780 |

* cited by examiner

*Primary Examiner* — Thanh-Ha Dang
(74) *Attorney, Agent, or Firm* — Cuenot, Forsythe & Kim, LLC

(57) ABSTRACT

A method, computer program product, and system for receiving a natural language query. The natural language query is parsed into a plurality of base concepts. One or more base concepts chosen from the plurality of base concepts is processed to define a selected report template. The selected report template is selected from a plurality of default report templates. At least one of the base concepts chosen from the plurality of base concepts is mapped to a data field within data via a mapping dictionary. The data includes a plurality of records. A query is executed on at least a portion of the data to identify a result record set. The result record set defines at least a portion of the plurality of records.

20 Claims, 3 Drawing Sheets

REPORT GENERATION SYSTEM AND METHOD

TECHNICAL FIELD

The present invention relates to report generation systems and, more particularly to report generation systems that generate reports in response to natural language queries.

BACKGROUND

Businesses are driven by being able to answer qualitative questions using quantitative measures. Unfortunately, the conversion of qualitative queries to quantitative answers is typically accomplished via manual intervention and human guesswork. Therefore, the resulting reports contain a mixture of data presented after significant human analysis.

Typically, most current systems that try to answer qualitative questions use static forms that extract data from databases or other data repositories. These static forms are designed by domain experts who know what data sets are relevant to each question and what format to present the answers. Unfortunately, all systems based on static forms are limited in the answers they can provide and they can only answer the questions that are specified by the domain expert and the form designers.

SUMMARY OF THE DISCLOSURE

In a first implementation, a method includes receiving a natural language query. The natural language query is parsed into a plurality of base concepts. One or more base concepts chosen from the plurality of base concepts is processed to define a selected report template. The selected report template is selected from a plurality of default report templates. At least one of the base concepts chosen from the plurality of base concepts is mapped to a data field within data via a mapping dictionary. The data includes a plurality of records. A query is executed on at least a portion of the data to identify a result record set. The result record set defines at least a portion of the plurality of records.

One or more of the following features may be included. The result record set may be processed to define an answer to the natural language query. The answer may be presented to a user. Presenting the answer to the user may include formatting the answer in accordance with the selected report template.

The data may be configured as: a spreadsheet, a database, or a flat file. The mapping dictionary may include metadata configured to define one or more mappings between the at least one base concept and the data field within the data store. The metadata may include one or more complimentary concepts that are related to the base concepts. The complimentary concepts may be configured to define at least a portion of the one or more mappings between the at least one base concept and the data field within the data store. The complimentary concepts may be chosen from the group consisting of: related concepts, sub-concepts, and super-concepts.

In another implementation, a method includes receiving a natural language query. The natural language query is parsed into a plurality of base concepts. One or more base concepts chosen from the plurality of base concepts is processed to define a selected report template. The selected report template is selected from a plurality of default report templates. At least one of the base concepts chosen from the plurality of base concepts is mapped to a data field within data via a mapping dictionary. The data includes a plurality of records. A query is executed on at least a portion of the data to identify a result record set. The result record set defines at least a portion of the plurality of records.

One or more of the following features may be included. The result record set may be processed to define an answer to the natural language query. The answer may be presented to a user. Presenting the answer to the user may include formatting the answer in accordance with the selected report template.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
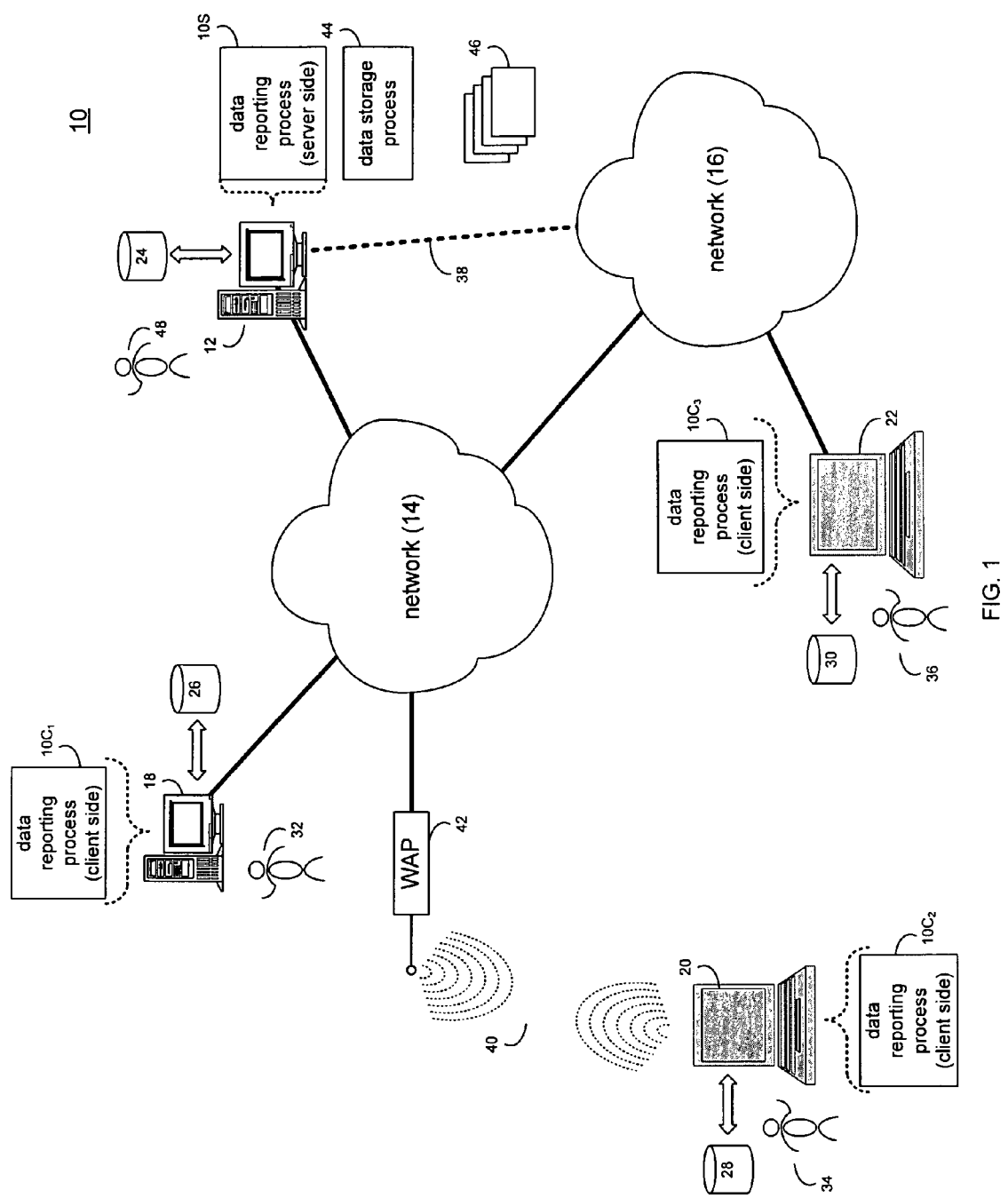
FIG. 1 is a diagrammatic view of a data reporting process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks Referring to FIG. 1, there is shown data reporting process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

Server computer 12 may execute a web server application (not shown), examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 16), examples of which may include but are not limited to: a local area network; a wide area network; or an intranet, for example.

As will be discussed below in greater detail, data reporting process 10 may receive and parse a natural language query into a plurality of base concepts. One or more of the base concepts may be processed to define a selected report template. Further, at least one of the base concepts may be mapped to a data field within data via a mapping dictionary. A query may be executed on at least a portion of the data to identify a result record set.

Data reporting process 10 may be a server-side process (e.g., server-side data reporting process 10S) executed on server computer 12; a client side process (client-side data reporting process $10C_1$, client-side data reporting process $10C_2$, client-side data reporting process $10C_3$) executed on a client electronic device (e.g., desktop computer 18, laptop computer 20, notebook computer 22, a personal digital assistant (not shown), a data-enabled, cellular telephone (not shown), and a dedicated network device (not shown), for example); or a hybrid server-side/client-side process that e.g., utilizes server-side data reporting process 10S and at least one of client-side data reporting process $10C_1$, client-side data reporting process $10C_2$, client-side data reporting process $10C_3$ to effectuate the functionality of data reporting process 10.

The instruction sets and subroutines of data reporting process 10S, which may be stored on storage device 24 coupled to server computer 12, may be executed by one or more processors (not shown) and one or more memory architectures (not shown) incorporated into server computer 12. Storage device 24 may include but is not limited to: a hard disk drive; a tape drive; an optical drive; a RAID array; a random access memory (RAM); and a read-only memory (ROM).

The instruction sets and subroutines of data reporting process $10C_1$, which may be stored on storage device 26 coupled to desktop computer 18, may be executed by one or more processors (not shown) and one or more memory architectures (not shown) incorporated into desktop computer 18. Storage device 26 may include but is not limited to: hard disk drives; tape drives; optical drives; RAID arrays; random access memories (RAM); read-only memories (ROM), compact flash (CF) storage devices, secure digital (SD) storage devices, and memory stick storage devices.

The instruction sets and subroutines of data reporting process $10C_2$, which may be stored on storage device 28 coupled to laptop computer 20, may be executed by one or more processors (not shown) and one or more memory architectures (not shown) incorporated into laptop computer 20. Storage device 28 may include but is not limited to: hard disk drives; tape drives; optical drives; RAID arrays; random access memories (RAM); read-only memories (ROM), compact flash (CF) storage devices, secure digital (SD) storage devices, and memory stick storage devices.

The instruction sets and subroutines of data reporting process $10C_3$, which may be stored on storage device 30 coupled to notebook computer 22, may be executed by one or more processors (not shown) and one or more memory architectures (not shown) incorporated into notebook computer 22. Storage device 30 may include but is not limited to: hard disk drives; tape drives; optical drives; RAID arrays; random access memories (RAM); read-only memories (ROM), compact flash (CF) storage devices, secure digital (SD) storage devices, and memory stick storage devices.

Using client-side data reporting process $10C_1$, client-side data reporting process $10C_2$, client-side data reporting process $10C_3$, users 32, 34, 36 (respectively) may access server-side data reporting process 10S and effectuate the functionality of data reporting process 10.

Users (e.g., users 32, 34) may access server computer 12 (i.e., the computer that executes server-side data reporting process 10S) directly through network 14. Additionally/alternatively, server computer 12 may be connected to network 14 through secondary network 16 (as illustrated with link line 38; shown in phantom) and, therefore, users (e.g., user 36) may access server computer 12 via network 16.

The various client electronic devices may be directly or indirectly coupled to network 14 (or network 16). For example, personal computer 18 is shown directly coupled to network 14 via a hardwired network connection. Further, notebook computer 22 is shown directly coupled to network 16 via a hardwired network connection. Laptop computer 20 is shown wirelessly coupled to network 14 via wireless communication channel 40 established between laptop computer 20 and wireless access point (i.e., WAP) 42, which is shown directly coupled to network 14. WAP 42 may be, for example, an IEEE 802.11a, 802.11b, 802.11g, Wi-Fi, and/or Bluetooth device that is capable of establishing wireless communication channel 40 between laptop computer 18 and WAP 42.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 18, 20, 22 may each execute an operating system, examples of which may include but are not limited to Microsoft Windows™, Microsoft Windows CE™, Redhat Linux™, or a custom operating system.

Server computer 12 may also execute a data storage process 44 that gathers and stores data 46 concerning one or more processes/procedures being partially or completely performed on server computer 12. Data storage process 44 may be a stand-alone product (e.g., a database) or may be a portion of another program (e.g., National Instruments LabVIEW™ and National Instruments TestStand™) Depending on the particular application, data storage process 44 many automatically store and gather data 46 or data 46 may be manually entered into data storage process 44. Data 46 may be configured as e.g., a spreadsheet, a database, or a flat file.

Data storage process 44 may be a software development platform (e.g., National Instruments LabVIEW™ and National Instruments TestStand™) that is configured to test software that is being developed by e.g., users 32, 34, 36. During the execution of such development/testing procedures, data storage process 44 may automatically gather data 46, wherein data 46 may concern e.g., error codes generated while testing a piece of software, and failure codes generated concerning various pieces of hardware. Often, the quantity of data 46 is quite large and, therefore, the process of extracting usable information from data 46 may be difficult/time consuming.

Data Reporting Process

Figure 2:
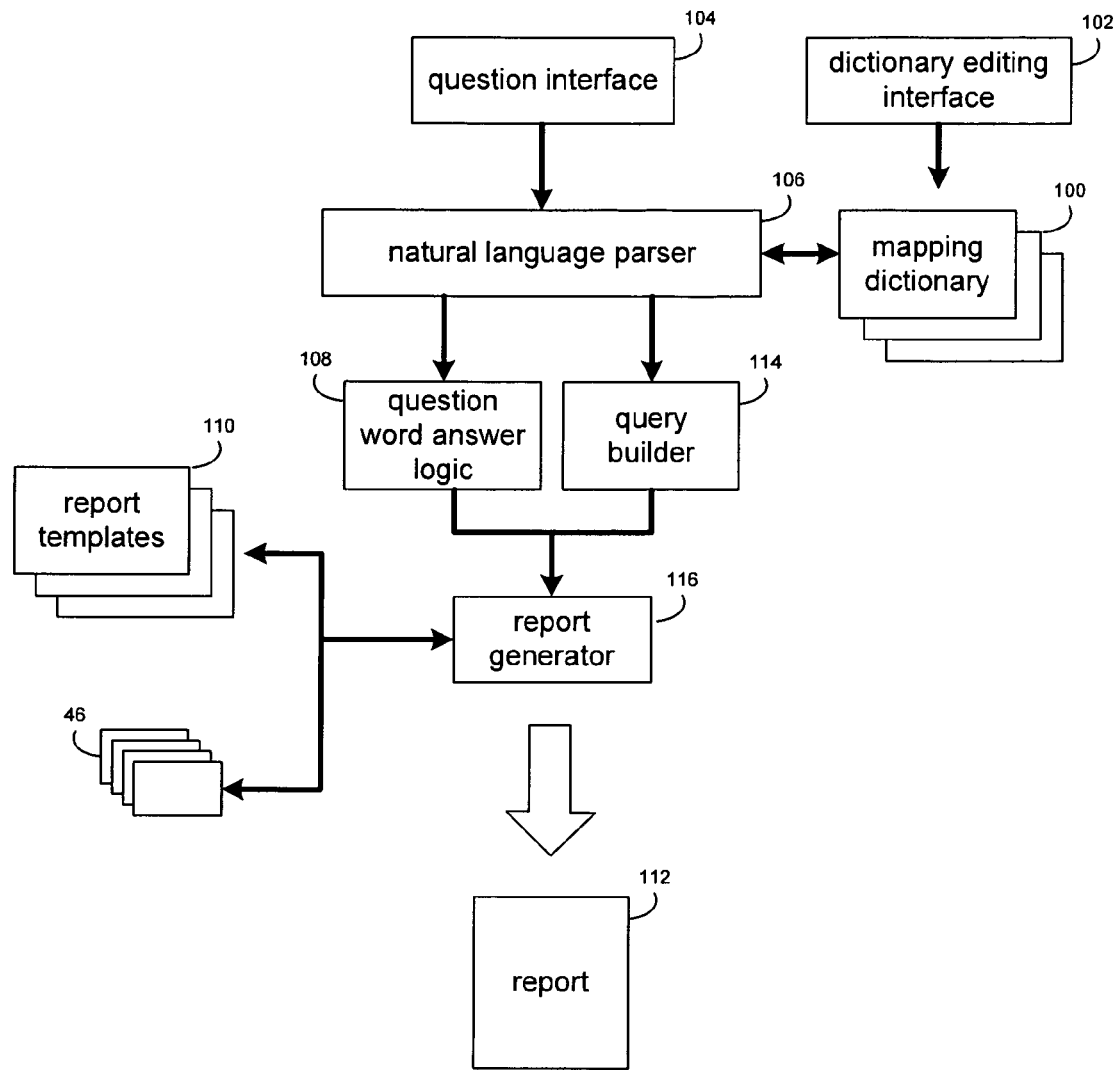
FIG. 2 is a more-detailed diagrammatic view of data reporting process of FIG. 1.

Referring also to FIG. 2, there is shown one exemplary embodiment of data reporting process 10. Data reporting process 10 may allow for the simplified searching/utilization/reporting of data 46.

As discussed above and as will be discussed below in greater detail, data reporting process 10 may receive and parse a natural language query into a plurality of base concepts. One or more of the base concepts may be processed to define a selected report template. Further, at least one of the base concepts may be mapped to a data field within data via a mapping dictionary. A query may be executed on at least a portion of the data to identify a result record set.

Manager 48 (e.g., a lab manager, a software development manager, a project manager) may define mapping dictionary 100. Mapping dictionary 100 may include metadata configured to define mappings between base concepts included within the above-described natural language queries and one or more data fields included within data 46.

As will be discussed below in greater detail, the metadata included within mapping dictionary 100 may include one or more complimentary concepts (e.g., "disk drive", "hard drive", "drive", "disk", "storage device") that are related to the base concepts (e.g., "hard disk") included within the above-described natural language queries. Examples of such complimentary concepts may include but are not limited to related concepts, sub-concepts, and super-concepts. For example, if the base concept (as defined within the above-described natural language query) is "hard disk", an example of a related concept may include "hard drive" (i.e., a synonym), an example of a sub-concept may include "SATA hard disk" (which only includes a particular type of hard disk), and an example of a super-concept may include "drive" (which may also include optical drives).

The complimentary concepts included within mapping dictionary 100 may be configured to define at least a portion of the mappings between the base concepts included within the above-described natural language queries and the data field within data 46 (e.g., "hard disk" is equal to "storage device" and "storage device" is defined within data field "storage.device" included within the data records of data 46.

As discussed above, mapping dictionary 100 may be defined by (in this example) manager 48. Additionally, the process of defining mapping dictionary 100 need not be a binary process in which mapping dictionary 100 is defined a single time and then left unchanged. Specifically, mapping dictionary 100 may be repeatedly expanded/modified to e.g., define additional mappings and/or add additionally complimentary concepts. Accordingly and with respect to mapping dictionary 100, data reporting process 10 may be an extensible system.

For illustrative purposes, assume that data storage process 44 is included within a product development application for a system under development by e.g., users 32, 34, 36. Assume that manager 48 is the product development manager for the system under development. Further, assume that data 46 is generated by the above-described product development application and gathered/stored by data storage process 44, wherein data 46 includes data related to the development of the above-described system (e.g., error codes/reports, failure codes/reports, test results, and performance statistics). Further, assume that manager 48 has defined mapping dictionary 100 via dictionary editing interface 102, thus defining the above-described metadata (e.g., complimentary terms and mappings).

Assume for illustrative purposes that user 32 (i.e., one of the system developers managed by manager 48) wishes to determine the number of machine failures that have occurred over the past three years and the type of hard disks included in those machines. User 32 may formulate a natural language query (e.g., "How many machines have failed in the last three years and what brand of hard disks did the machines have?") utilizing question interface 104 included within data reporting process 10.

Figure 3:
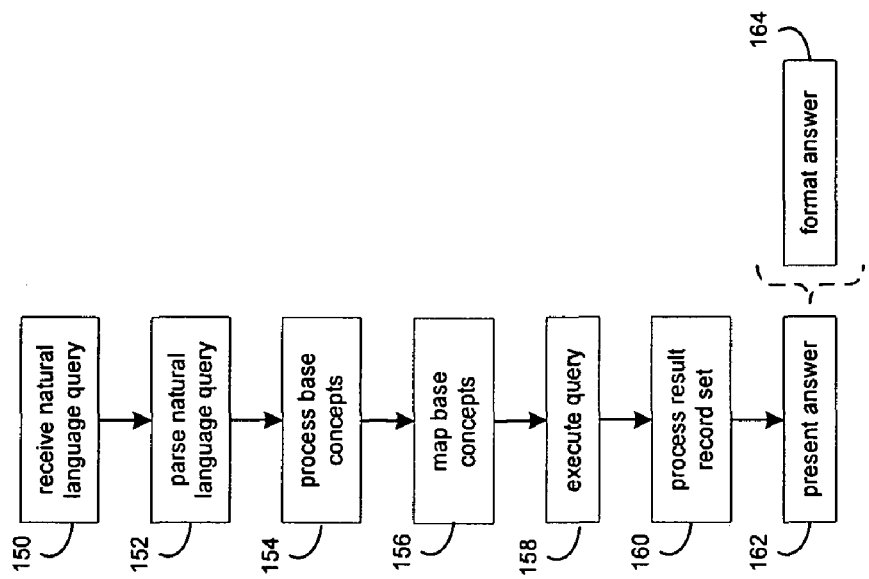
FIG. 3 is a flow chart of the data reporting process of FIG. 1.

Referring also to FIG. 3, upon receiving 150 the natural language query "How many machines have failed in the last three years and what brand of hard disks did the machines have?", natural language parser 106 included within data reporting process 10 may parse 152 the natural language query into a plurality of base concepts. In this example, a base concept is a logical portion of the natural language query.

For example, when parsing 152 the natural language query received 150 by data reporting process 10, natural language parser 106 may consider the follow portions of the natural language query. "How many", which may be indicative of the desire of user 32 to receive a single numerical answer. Further, the natural language query includes an "and", which may be indicative of the desire of user 32 to receive a multi-part answer. And after the word "and", the natural language query includes "what . . . did the machines have", which may be indicative of a categorization with an unspecified "target". In this particular example, the "target" may be the "brand of hard disks."

Accordingly, after natural language parser 106 (included within data reporting process 10) parses 152 the natural language query into (in this example) a plurality of base concepts (namely, "How many", "and", "what . . . did the machines have", and "target"), question word answer logic 108 (included within data reporting process 10) may process 154 one or more of these base concepts (e.g., "How many", "and", "what . . . did the machines have", and "target") to define a selected report template. For example, since this natural language query appears to be a categorization, data reporting process 10 generally (and question word answer logic 108 specifically) may define the selected report template as a bar graph report template, where the selected report template (e.g., the bar graph report template) is selected from a default report templates group 110.

The initial group of report templates 110 may be defined by e.g., manager 48. Additionally, the process of defining report templates 110 need not be a binary process in which report templates group 110 is defined a single time and then left unchanged. Specifically, report templates group 110 may be repeatedly expanded/modified to e.g., define additional report templates. Accordingly and with respect to report templates group 110, data reporting process 10 may be an extensible system.

As discussed above, data 46 may be configured as e.g., a spreadsheet, a database, or a flat file. Accordingly, data 46 may include a plurality of records. For example, if data 46 is configured as a database, data 46 may include a plurality of database records (i.e., a plurality of data records). Further, if data 46 is configured as a spreadsheet, data 46 may include a plurality of data rows (i.e., a plurality of data records). Additionally, if data 46 is configured as a flat file, data 46 may include a plurality of data lines (i.e., a plurality of data records). While three examples of data 46 are described, this is for illustrative purposes only and is not intended to be a limitation of this disclosure, as other configurations are possible and are considered to be within the scope of this disclosure.

Via mapping dictionary 100, data reporting process 10 may map 156 at least one base concepts to one or more data fields included within the above-described data records within data 46. This mapping may occur directly, in that the base concept is directly mapped to a data field. Alternatively, this mapping may occur indirectly, in that the base concept is mapped to a data field through one or more complimentary concepts. As discussed above, the complimentary concepts included within mapping dictionary 100 may be configured to define at least a portion of the mappings between the base concepts included within the above-described natural language queries and the data field within data 46 (e.g., "hard disk" is equal to "storage device" and "storage device" is mapped to data field "storage.device" included within the data records of data 46. Accordingly, the complimentary concept "storage device" indirectly maps "hard disk" to the appropriate data field ("storage.device").

As is known in the art, a database record may include a plurality of database fields (i.e., data fields), a row within a spreadsheet may include a plurality of data cells (i.e., data fields), and a data line within a flat file may include a plurality of definable data portions (i.e., data fields). Further, the base concepts processed 154 by data reporting process 10 may be the same as (or different from) the base concepts utilized by data reporting process 10 when mapping 156 the base concepts to the data fields within data 46

Assume for illustrative purposes that in this particular example, data reporting process 10 utilizes different base concepts when mapping 156 the base concepts to the data fields within data 46. Accordingly, assume for illustrative purposes that once data reporting process 10 defines the bar graph report template for use when generating report 112, natural language parser 106 included within data reporting process 10 may parse 152 the natural language query (i.e., "How many machines have failed in the last three years and what brand of hard disks did the machines have?") into the following base concepts: "failed", "in the last three years", "machine", "hard disk", "brand" and "and". Query builder 114 (included within data reporting process 10) may then execute 158 a query on at least a portion of data 46 to identify a result record set (that is defined from the above-described plurality of records).

Continuing with the above-stated example and concerning the manner in which data reporting process 10 maps 156 base concepts and executes 158 queries, query builder 114 may include the base concept "failed" within the query that will be executed 156 by data reporting process 10. The "failed" base concept may be further abstracted to more detailed concepts of what "failed" means. For example, a "failed" hard disk may be defined by data reporting process 10 as a hard disk that has completely stopped working; or may be defined as a hard disk that is no longer working optimally. This recursion may be repeated by data reporting process 10 until the base concept is mappable 156 onto the data fields within the data records of data 46. For example, data reporting process 10 may map 156 the base concept "failed" to data field "disk.failure" within the various data records of data 46.

As discussed above, the metadata included within mapping dictionary 100 may include one or more complimentary concepts, example of which may include but are not limited to: related concepts, sub-concepts, and super-concepts. For example and as discussed above, if the base concept (as defined within the above-described natural language query) is "hard disk", an example of a related concept may include "hard drive" (i.e., a synonym), an example of a sub-concept may include "SATA hard disk" (which only includes a particular type of hard disk), and an example of a super-concept may include "drive" (which may also include optical drives). Accordingly, data reporting process 10 may use such complimentary terms to adjust the scope of the base concepts (e.g., expand the scope of the base concept "failed" to cover reduced performance). Additionally and as discussed above, these complimentary concepts may be utilized as intermediate steps for indirectly mapping a base concept to a data field. Accordingly, for the base concept "hard disk", a direct mapping to a data filed may not exist within mapping dictionary 100. However, the base concept "hard disk" is equal to the complimentary concept "storage device", which is mapped to data field "storage.device" included within the data records of data 46.

Concerning the "in the last three years" base concept, data reporting process 10 may modify the query being generated by query builder 114 to filter out failures that occurred longer than three years ago. Accordingly, data reporting process 10 may map 156 the base concept "in the last three years" to data field "dateOfFailure" within the various data records of data 46, with the limitation that the date included within the data field "dateOfFailure" is less than or equal to a date three years ago. Accordingly, query builder 114 may refine the above-described query that will be executed 156 by data reporting process 10 to only identify failures that occurred within the last three years.

Concerning the base concepts "machine", "hard disk" and "brand", data reporting process 10 may consider the base concept "brand" to be a property of the base concept "hard disk" (which mapping dictionary 100 may map to the data field "fixeddisk.brand" within the data records of data 46) and may consider the base concept "hard disk" to be a property of the base concept "machine" (which mapping dictionary 100 may map to the data field machine.fixeddisk within the data records of data 46). Accordingly, query builder 114 may refine the above-described query to determine the number of each unique type within the data field "machine.fixeddisk.brand" within the data records of data 46.

Once query builder 114 (included within data reporting process 10) defines the query to be executed on data 46, query builder 114 may execute 158 the query on data 46 (or a portion thereof) to identify a result record set (e.g., thirteen records chosen from one thousand records). Report generator 116 (included within data reporting process 10) may process 160 the result record set to define an answer to the natural language query, which may be presented 162 to the requesting user (e.g., user 32) in the form of report 112. When presenting 164 the answer to user 32, the answer may be formatted 164 in accordance with the selected report template (i.e., the bar graph report template) to generate report 112. For example, data reporting process 10 may present to user 32 a bar chart that shows the total number of hard disk failures that have occurred in the past three years (e.g., thirteen total failures) broken down based upon computer manufacturer (e.g., Manufacturer X had four failures, Manufacturer Y had seven failures, and Manufacturer Z had two failures).

While data reporting process 10 is described above as being used in a software/lab management scenario, this is for illustrative purposes only and is not intended to be a limitation of this disclosure, as other configurations are possible and are considered to be within the scope of this disclosure. For example, data reporting process 10 may be utilized within a consumer products rating/review site in which data is collected from a plurality of sources that concerns warranty claims against various consumer products. Accordingly, a user of data reporting process 10 (when configured in such an environment) may enter a natural language query of "Which minivan gets the best gas mileage?", which may be parsed 152 by natural language parser 106 into base components "Which" "minivan", "best" and "gas mileage".

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
receiving a natural language query;
parsing the natural language query into a plurality of base concepts;
processing, using a computer processor, one or more base concepts chosen from the plurality of base concepts to define a selected report template, wherein the selected report template is selected from a plurality of default report templates;
mapping, via a mapping dictionary, at least one of the base concepts chosen from the plurality of base concepts to a data field within data, wherein the data includes a plurality of records; and
executing a query on at least a portion of the data to identify a result record set, wherein the result record set defines at least a portion of the plurality of records, wherein the natural language query is a logic question having a plurality of logical elements, and each of the plurality of base concepts corresponds to one of the plurality of logical elements.

2. The method of claim 1, further comprising:
processing the result record set to define an answer to the natural language query.

3. The method of claim 2, further comprising:
presenting the answer to a user.

4. The method of claim 3, wherein presenting the answer to the user includes: formatting the answer in accordance with the selected report template.

5. The method of claim 1, wherein the report template is selected based upon a quantitative base concept.

6. The method of claim 1, wherein the mapping dictionary includes metadata configured to define one or more mappings between the at least one base concept and the data field within a data store.

7. The method of claim 6, wherein the metadata includes one or more complimentary concepts that are related to the base concepts, wherein the complimentary concepts are configured to define at least a portion of the one or more mappings between the at least one base concept and the data field within the data store.

8. The method of claim 7, wherein the complimentary concepts are chosen from a group consisting of: related concepts, sub-concepts, and super-concepts.

9. A computer program product comprising a computer readable storage medium having a plurality of instructions stored thereon, which, when executed by a processor, cause the processor to perform operations comprising:
receiving a natural language query;
parsing the natural language query into a plurality of base concepts;
processing one or more base concepts chosen from the plurality of base concepts to define a selected report template, wherein the selected report template is selected from a plurality of default report templates;
mapping, via a mapping dictionary, at least one of the base concepts chosen from the plurality of base concepts to a data field within data, wherein the data includes a plurality of records; and
executing a query on at least a portion of the data to identify a result record set, wherein the result record set defines at least a portion of the plurality of records, wherein the natural language query is a logic question having a plurality of logical elements, and each of the plurality of base concepts corresponds to one of the plurality of logical elements.

10. The computer program product of claim 9, further comprising instructions for: processing the result record set to define an answer to the natural language query.

11. The computer program product of claim 10, further comprising instructions for: presenting the answer to a user.

12. The computer program product of claim 11, wherein the instructions for presenting the answer to the user include instructions for: formatting the answer in accordance with the selected report template.

13. The computer program product of claim 9, wherein the report template is selected based upon a quantitative base concept.

14. The computer program product of claim 9, wherein the mapping dictionary includes metadata configured to define one or more mappings between the at least one base concept and the data field within a data store.

15. The computer program product of claim 14, wherein the metadata includes one or more complimentary concepts that are related to the base concepts, wherein the complimentary concepts are configured to define at least a portion of the one or more mappings between the at least one base concept and the data field within the data store.

16. The computer program product of claim 15, wherein the complimentary concepts are chosen from a group consisting of: related concepts, sub-concepts, and super-concepts.

17. A computing system comprising:
at least one processor;
at least one memory architecture coupled with the at least one processor;
a first software module executed on the at least one processor and the at least one memory architecture, wherein the first software module is configured to receive a natural language query;
a second software module executed on the at least one processor and the at least one memory architecture, wherein the second software module is configured to parse the natural language query into a plurality of base concepts;
a third software module executed on the at least one processor and the at least one memory architecture, wherein the third software module is configured to process one or more base concepts chosen from the plurality of base concepts to define a selected report template, wherein the selected report template is selected from a plurality of default report templates;
a fourth software module executed on the at least one processor and the at least one memory architecture, wherein the fourth software module is configured to map, via a mapping dictionary, at least one of the base concepts chosen from the plurality of base concepts to a data field within data, wherein the data includes a plurality of records; and a fifth software module executed on the at least one processor and the at least one memory architecture, wherein the fifth software module is configured to execute a query on at least a portion of the data to identify a result record set, wherein the result record set defines at least a portion of the plurality of records, wherein the natural language query is a logic question having a plurality of logical elements, and each of the plurality of base concepts corresponds to one of the plurality of logical elements.

18. The computing system of claim 17, further comprising a sixth software module executed on the at least one processor and the at least one memory architecture, wherein the sixth software module is configured to process the result record set to define an answer to the natural language query.

19. The computing system of claim 18, wherein the report template is selected based upon a quantitative base concept.

20. The computing system of claim 18, wherein the sixth software module is further configured to: format the answer in accordance with the selected report template.

* * * * *